Nov. 1, 1955 R. E. MARBURY 2,722,634
HIGH-VOLTAGE CAPACITOR ASSEMBLY
Filed April 9, 1952 2 Sheets-Sheet 1

Fig. I.

WITNESSES:
John E. Hursley
Leon M. Garman

INVENTOR
Ralph E. Marbury.
BY F. P. Lyle
ATTORNEY

Nov. 1, 1955 R. E. MARBURY 2,722,634
HIGH-VOLTAGE CAPACITOR ASSEMBLY
Filed April 9, 1952 2 Sheets-Sheet 2

WITNESSES:
John E. Hensley
Leon M. Garman

INVENTOR
Ralph E. Marbury.
BY F. P. Lyle
ATTORNEY

United States Patent Office 2,722,634
Patented Nov. 1, 1955

2,722,634

HIGH-VOLTAGE CAPACITOR ASSEMBLY

Ralph E. Marbury, Pittsburgh, Pa., assignor to Westinghouse Electric Corporation, East Pittsburgh, Pa., a corporation of Pennsylvania Application April 9, 1952, Serial No. 281,311

7 Claims. (Cl. 317—99)

The present invention relates to high-voltage capacitor assemblies, and more particularly to a capacitor assembly of the open rack type, for high-voltage service, which provides electrostatic shielding to prevent corona.

When capacitors are mounted in open racks and connected in a high-voltage line, a serious problem of corona frequently exists. For example, capacitor banks which are connected in series in high-voltage transmission lines, to raise the stability limit and thus increase the amount of power that can be transmitted over the line, operate at the line potential, which may be as high as 230 kilovolts. Such capacitor banks are made up of a large number of individual capacitor units which are frequently of the outdoor type mounted in open racks. Each capacitor unit has an individual fuse and the capacitors are connected to buses in the racks. Thus, such an installation has a large number of terminals, fuses, buses, and connectors which present many points and sharp edges where corona is likely to occur because of the high voltage at which the bank operates and the high electrostatic voltage stress. Such corona is, of course, highly objectionable, since it causes noise and radio interference, as well as an undesirable energy loss.

The principal object of the present invention is to provide a high-voltage rack-type capacitor assembly in which the occurrence of corona is positively prevented.

Another object of the invention is to provide a high-voltage capacitor assembly consisting of a plurality of individual capacitor units mounted in an open rack and in which the rack itself is designed and constructed to serve as an electrostatic shield to prevent corona.

Other objects and advanatges of the invention will be apparent from the following detailed description, taken in connection with the accompanying drawing, in which.

Figure 1:
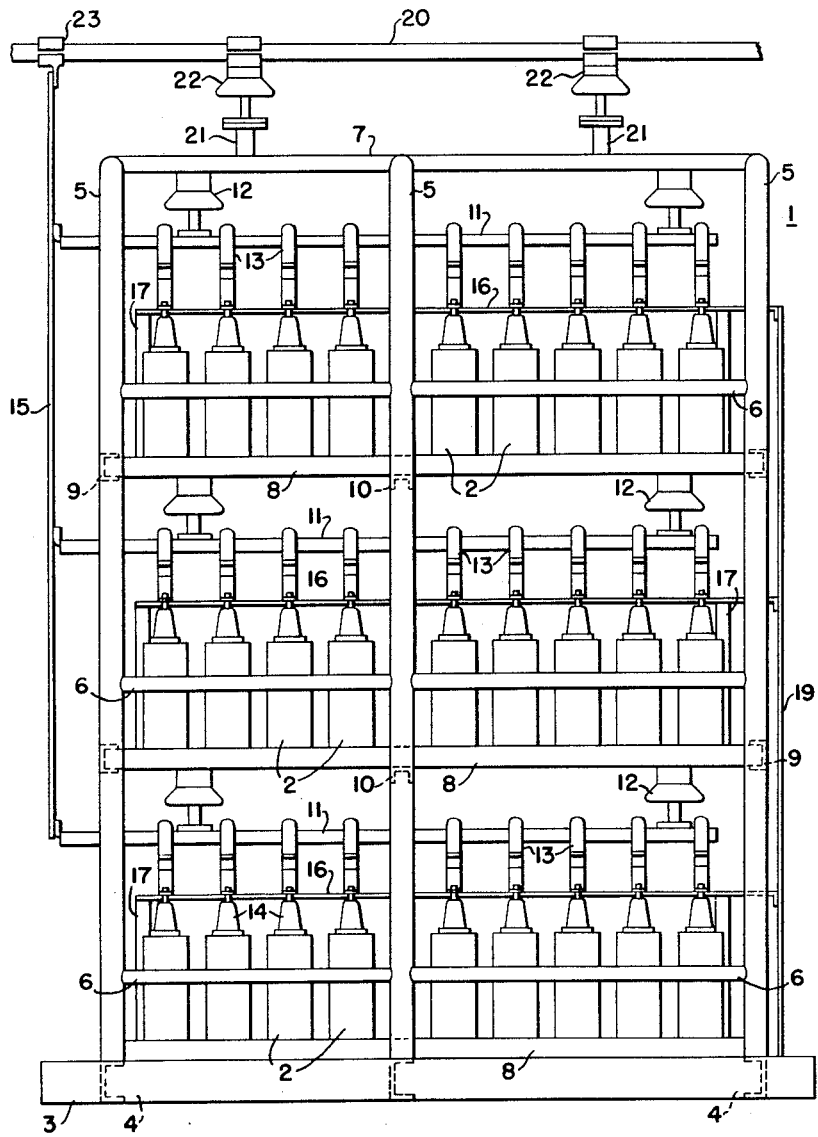
Figure 1 is a view in front elevation of a capacitor assembly embodying the invention.
Figure 2:
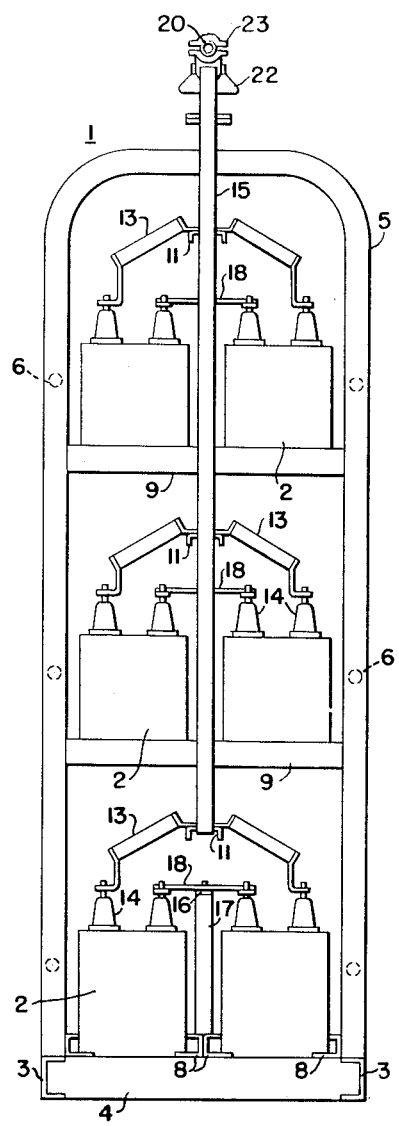
Fig. 2 is an end elevation of the capacitor assembly.

The drawing shows an open rack 1 in which a number of individual capacitor units 2 are mounted. The assembly is intended for high-voltage operation at voltages high enough to involve a serious risk of objectionable corona occurring on the capacitor terminals, buses, and connectors if the conventional type of rack construction were used. In the preferred embodiment of the invention, shown in the drawing, the rack 1 has a base made up of longitudinal channel members 3 with transverse channel members 4 disposed between them and welded in place to form a strong, rigid base. The rack also includes a plurality of conducting frame members 5 of inverted U-shape, as clearly seen in Fig. 2. The frame members 5 have a circular cross-section of relatively large diameter, and may suitably be made of large diameter steel pipe. It will be noted that the frame members 5 are formed with curves of large radius at the top of the structure and because of the circular cross-section, there are no corners or sharp edges. The frame members 5 are welded or otherwise rigidly secured to the base, a sufficient number of frame members being used to provide a strong and rigid structure. The frame members 5 are connected by horizontal conducting tie members 6 which extend longitudinally between the frame members and which are preferably also made of steel pipe or rod, so as to have a circular cross-section of somewhat smaller diameter than that of the frame members 5. The tie members 6 are welded to the frame members and are spaced apart vertically on each side of the assembly, an additional tie member 7 being provided at the top of the assembly. It will be seen that a rigid, cage-like rack structure is thus provided which has no sharp edges or corners, so that it is capable of functioning as an electrostatic shield and will not itself cause corona.

The capacitors 2 are outdoor capacitor units of any desired type and size and are supported within the rack structure on suitable supporting members. In the illustrated embodiment, the capacitors 2 are supported on rails or channel members 8 which extend longitudinally within the frame members 5. The channel members 8 are supported at the ends in transverse channel members 9 which are welded between opposite sides of the frame members 5, and the channel members 8 are supported at the center by transverse channel members 10 extending transversely of the rack structure. It will be noted that the supporting members 8, 9 and 10 are well within the cage structure itself. The supporting members are arranged in three tiers in the rack, in the illustrated embodiment, although it will be obvious that any suitable or desired arrangement might be used, and the capacitors 2 are preferably arranged in two rows in each tier, as shown.

A horizontal bus 11, of copper strap, is provided for each tier of capacitors. The buses 11 of the two lower tiers are suspended by insulators 12 from the center supporting members 8 of the tier above, and the bus 11 of the top tier is suspended from the top tie member 7. Each capacitor 2 is provided with an individual fuse 13, which is connected to one of the terminals 14 of the capacitor and to the bus 11. The buses 11 extend longitudinally of the rack and all three of the buses are connected at one end to a vertical bus 15 for effecting connection to an external circuit.

In the particular embodiment shown, the capacitors 2 are all connected in parallel to the bus 15 and their other terminals are grounded to the base of the rack. For this purpose, a ground bus 16 is provided for each tier. The buses 16 are supported on vertical supports 17 at each end of the rack and extend longitudinally between the two rows of capacitors. The adjacent terminals of each pair of capacitors are connected to the bus 16 by connectors 18 which may be of any suitable type, such as copper strap connectors. The buses 16 extend longitudinally of the rack to the end opposite to the bus 15, and they are connected to a vertical bus 19 which extends to the base. The bus 19 may be connected to the adjacent transverse channel 4, or it may be connected to the base in any other desired manner.

Since these capacitor assemblies are usually utilized in groups of two or more racks, a line conductor 20 is preferably supported on the rack 1 itself. For this purpose, supports 21 are provided on the top tie member 7 and insulators 22 are mounted on the supports 21. The line conductor 20, which may be a copper tube or rod, is clamped on the insulators 22. The vertical bus 15 extends above the rack 1 and is connected directly to the line conductor 20 by a clamp-type connector 23 of any suitable type.

It will be seen that the assembly of capacitors described includes a large number of capacitor terminals, fuses, connectors, and buses, which present many points and sharp edges at which corona could occur if the capacitors were mounted in a rack of conventional construction and connected in a high-voltage line. The present invention, however, provides a rack 1 which is constructed to provide a cage-like structure with no sharp corners or edges and which is arranged to function effectively as an electrostatic shield. All the elements of the capacitor assembly which might cause corona are disposed within this cage-like structure and thus corona is positively prevented, since the entire asembly is shielded by the rack itself. Effective shielding is provided in this way, even though it would be impractical, if not impossible, to prevent corona by attempting to shield each element of the assembly individually.

Figure 3:
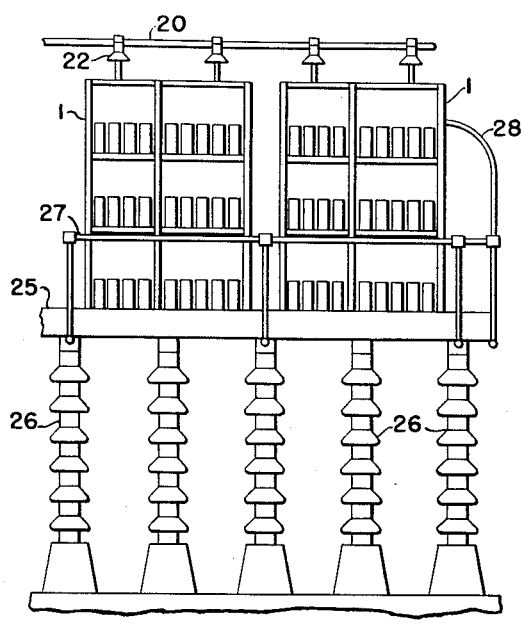
Fig. 3 is a view in elevation, on a smaller scale, showing a typical arrangement of these capacitor assemblies in a high-voltage capacitor bank.

Fig. 3 shows a typical arrangement of a large capacitor bank which comprises a plurality of rack-type asemblies of the type described above. The drawing shows a part of a large series capacitor bank for a 230 kilovolt transmission line, which operates at such a high voltage with respect to ground that corona would be unavoidable if conventional open racks were used. The capacitor racks 1 are supported on a steel platform 25 which is mounted on insulator columns 26 which support the platform and insulate it from ground. The conductor 20 extends across the entire bank, or a suitable part of the bank, and connects the capacitors together and to the line. A handrail 27 is provided on the platform 25 and serves to control the distribution of the electrostatic voltage stress around the bank. An additional shielding member 28 is preferably provided at the end of the bank. This shielding member may be mounted on the handrail at that end and extends to the ground bus 19 of the end capacitor rack. It will be apparent that an approximately uniform distribution of voltage stress around the complete bank is obtained by this means, and the construction of the capacitor racks themselves is such that the elements of the assembly are shielded so that no corona can occur.

A specific embodiment of the invention has been shown and described, for the purpose of illustration, but it will be apparent that various modifications may be made within the scope of the invention, and it is to be understood, therefore, that the invention is not limited to the specific details of construction shown, but in its broadest aspects, it includes all equivalent embodiments and modifications which come within the scope of the appended claims.

I claim as my invention:

1. A high-voltage capacitor assembly comprising a base, a plurality of inverted U-shaped conducting frame members mounted on the base, said frame members having a circular cross-section of relatively large diameter, a plurality of longitudinal and transverse supporting and tie members secured to said frame members to form a cage-like rack structure, a plurality of capacitor units supported on said supporting members, buses in the rack structure, and means for connecting the capacitor units to the buses, said capacitor units and connecting means being disposed entirely within the rack structure.

2. A high-voltage capacitor assembly comprising a base, a plurality of inverted U-shaped conducting frame members mounted on the base, said frame members having a circular cross-section of relatively large diameter, a plurality of conducting tie members of circular cross-section secured to said frame members to form a cage-like rack structure, a plurality of supporting members secured to the frame members, a plurality of capacitor units supported on said supporting members, buses in the rack structure, and means for connecting the capacitor units to the buses, said capacitor units and connecting means being disposed entirely within the rack structure.

3. A high-voltage capacitor assembly comprising a base, a plurality of inverted U-shaped conducting frame members mounted on the base, said frame members having a circular cross-section of relatively large diameter, a plurality of conducting tie members of circular cross-section secured to said frame members and extending longitudinally between the frame members to form a cage-like rack structure, a plurality of supporting members secured to the frame members within the cage-like structure, a plurality of capacitor units supported on the supporting members, an individual fuse for each capacitor unit, buses in the rack structure and means for connecting the capacitor units to the buses, said capacitor units, fuses and connecting means being disposed entirely within the rack structure.

4. A high-voltage capacitor assembly comprising a base, a plurality of inverted U-shaped conducting frame members mounted on the base, said frame members having a circular cross-section of relatively large diameter, a plurality of conducting tie members secured to the frame members to form a cage-like rack structure, a plurality of horizontal supporting members arranged in tiers in the rack structure, a plurality of capaictor units supported on the supporting members, horizontal buses in the rack structure, means for connecting the capacitor units to the buses, and vertical buses at the ends of the rack structure, the horizontal buses being connected to the vertical buses.

5. A high-voltage capacitor assembly comprising a base, a plurality of inverted U-shaped conducting frame members mounted on the base, said frame members having a circular cross-section of relatively large diameter, a plurality of conducting tie members of circular cross-section secured to said frame members and extending longitudinally between the frame members to form a cage-like rack structure, said frame members having a circular cross-section of relatively large diameter, a plurality of conducting tie members secured to the frame members to form a cage-like rack structure, a plurality of horizontal supporting members arranged in tiers in the rack structure, a plurality of capacitor units supported on the supporting members, an individual fuse for each capacitor unit, horizontal buses in the rack structure, means for connecting the capacitor units to the buses, and vertical buses at the ends of the rack structure, the horizontal buses being connected to the vertical buses, and the capacitor units, fuses and connecting means being disposed entirely within the rack structure.

6. A high-voltage capacitor assembly for use at voltages at which corona may occur, said assembly comprising a base, a plurality of frame members of conducting material of circular cross-section on the base, each of the frame members having vertical portions at opposite sides of the base and a top portion joining the vertical portions, the top portion being connected to the vertical portions by curves of relatively large radius, a plurality of longitudinal tie members of conducting material of circular cross-section connecting the frame members to form an open, cage-like rack structure capable of functioning as an electrostatic shield, supporting means in said rack structure, and a plurality of capacitors on said supporting means, the supporting means and capacitors being entirely within the rack structure to be shielded thereby.

7. A high-voltage capacitor assembly for use at voltages at which corona may occur, said assembly comprising a base, a plurality of frame members of conducting material of circular cross-section on the base, each of the frame members having vertical portions at opposite sides of the base and a top portion joining the vertical portions, the top portion being connected to the vertical portions by curves of relatively large radius, a plurality of longitudinal tie members of conducting material of circular cross-section connecting the frame members to form an open, cage-like rack structure capable of functioning as an electrostatic shield, supporting means in said rack structure, a plurality of capacitors on said supporting means, an individual fuse for each capacitor, buses in the rack structure, and means for connecting the capacitors to the buses, the capacitors, fuses and connecting means being entirely within the rack structure to be shielded thereby.

References Cited in the file of this patent

UNITED STATES PATENTS

| | | |
|---|---|---|
| 1,823,328 | Marbury | Sept. 15, 1931 |
| 1,928,460 | Paxton | Sept. 26, 1933 |
| 2,070,315 | Rawlins | Feb. 9, 1937 |
| 2,158,868 | Stacy | May 16, 1939 |
| 2,379,188 | Rugg | June 26, 1945 |